3,330,824
3-LOWER ALKOXY ESTRA-1,3,5(10)TRIENE-[17,16-c]-PYRAZOLES

Robert Eugene Schaub, Paramus, and Martin Joseph Weiss, Oradell, N.J., assignors to American Cyanamid Company, Stamford, Conn., a corporation of Maine
No Drawing. Filed Oct. 20, 1965, Ser. No. 499,018
8 Claims. (Cl. 260—239.5)

This application is a continuation-in-part of our copending application Ser. No. 205,552, filed June 27, 1962, now abandoned.

This invention relates to new steroid compounds. More particularly, it relates to estratrienopyrazoles, estratetraenopyrazoles, intermediates and method of preparing the same.

The novel steroids of the present invention can be illustrated by the following formulas:

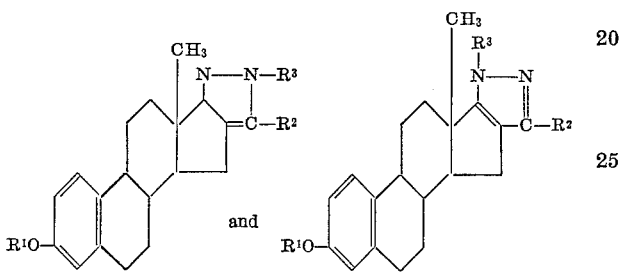

wherein $R^1$ is a lower alkyl radical, $R^2$ is a lower carboalkoxy radical, and $R^3$ is a member of the group consisting of hydrogen, phenyl, lower alkyl and lower alkanoyl radicals and salts thereof. Suitable lower alkyl, lower alkanoyl and lower carboalkoxy radicals contemplated by the present invention are those having up to six carbon atoms.

The compounds of the present invention are, in general, white crystalline solids recrystallizable from the usual organic solvents.

The novel compounds of this invention may be prepared by condensation of a 16-lower alkoxalyl-3-lower alkoxy-17-hydroxy-1,3,5(10)16-estratetraene or equivalent tautomers thereof, with hydrazine, phenyl hydrazine, or a lower alkyl substituted hydrazine such as methyl hydrazine. The resulting estratrieno-[17,16-c]pyrazole will have a lower carboalkoxy substituent at the 5'-position. These condensations are carried out in a solvent for the reactants such as methanol or ethanol for 30 minutes to 20 hours at a temperature in the range of 20° to 100° C., preferably for 2 to 3 hours at 65° to 80° C.

Treatment of the N,N-unsubstituted pyrazole derivatives with a lower alkanoic acid anhydride such as propionic anhydride gives an N-lower alkanoyl derivative. Treatment of the monosubstituted derivative with an alkyl halide such as methyl iodide produces the corresponding methiodide.

The products of this invention are isolated and purified by conventional procedures of evaporation, extraction and recrystallization well known to those skilled in the art.

The following equations illustrate the formation of certain of the compounds of this invention.

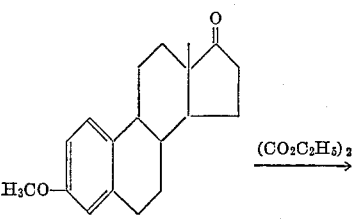

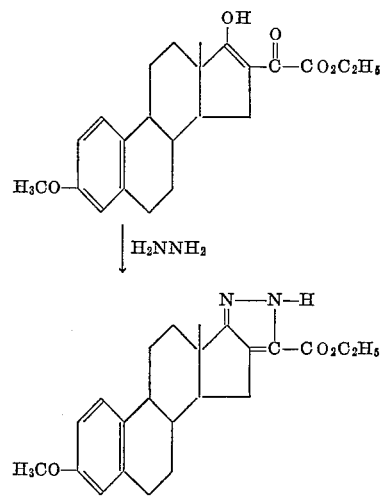

The N,N-unsubstituted pyrazole derivatives of this invention may exist in any of several tautomeric forms. These forms (A, B, C, D) can be represented as follows.

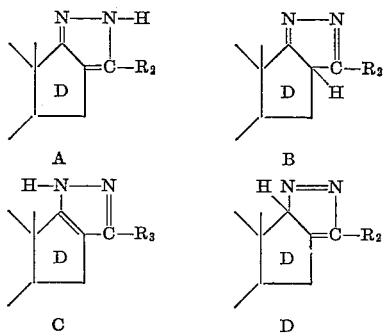

In the instances of forms B and D above, two configurations are possible depending upon whether the bond linking the pyrazole moiety to ring D of the steroid moiety at position 16 of form B and position 17 of form D is in the alpha or beta configuration. In the N-substituted derivatives, two isomers are possible depending upon which nitrogen is substituted since the two nitrogens are not equivalent. The 16-lower alkoxalyl derivatives may exist in any one of three tautomeric forms, the keto form of which has two possible configurations (G, H) depending on whether the linkage at C–16 is in the alpha or beta configuration. On the basis of spectroscopic evidence, as presently understood, structure E has been designated as the structure of the 16-lower alkoxalyl derivatives.

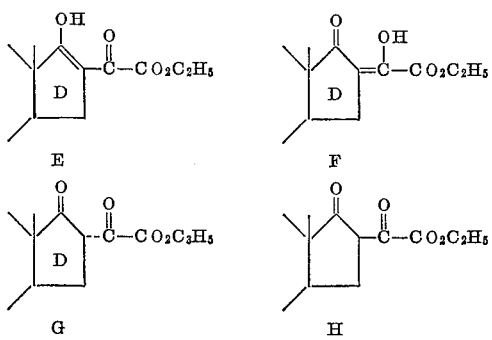

In the specification, specific structures are assigned to each product in order to make the disclosure more useful. These assignments of structure have been made upon the basis of chemical theory and on analysis of spectroscopic data as presently understood and is therefore not to be interpreted except in relation to the state of the art as presently known to organic chemists. It will be apparent that no part of the specification will be considered materially defective if it should later be established that the actual configuration, tautomer or isomer is different from that deducible from data presently available to workers in the field.

The compounds of this invention are estrogenic agents and may also be used in estrogen replacement therapy. They are also hypocholesterolemic agents and as such may be useful for the treatment of atherosclerosis. The ethoxalyl derivatives are useful as intermediates for the preparation of certain of the pharmacologically active derivatives.

The following examples illustrate in detail the preparation of estratrienopyrazoles, estratetraenopyrazoles, intermediates and methods of preparing the same.

*Example 1.—Preparation of 16-ethoxalyl-17-hydroxy-3-methoxy-1,3,5(10),16-estratetraene*

To a solution of 1.14 g. (4 mmoles) of 3-methoxy-1,3,5-estratrien-17-one in 120 ml. of anhydrous benzene is added 1.8 ml. of ethyl oxalate and 0.42 g. of 50% sodium hydride-oil dispersion. The reaction is started by the addition of a few drops of ethanol and the mixture is stirred under nitrogen for 16 hours. The yellow suspension is extracted several times with cold 1% aqueous potassium hydroxide solution and the extracts are added to aqueous 30% sodium dihydrogen phosphate solution. This mixture in turn is extracted with several portions of chloroform until these extracts no longer give a positive enol test. The combined chloroform extracts are washed with water, dried and evaporated. The residue is crystallized from ether to give 1.16 g. of a solid (strong positive enol test), melting point 140°–146° C. A sample recrystallized from acetone-hexane has melting point 141°–145° C., $[\alpha]_D + 63.4°$ (c. 1.04); $\lambda_{max.}$ 285 m$\mu$ ($\epsilon$ 9800 in acid); 298 m$\mu$ ($\epsilon$ 11,600 in methanol); 302 m$\mu$ ($\epsilon$ 20,600 in base);

$\lambda_{max.}^{KBr}$ 5.74$\mu$ (s), 5.96$\mu$ (s), 6.21$\mu$ (s)

*Example 2.—Preparation of 5'-ethoxycarbonyl-3-methoxy-1,3,5(10)-estratrieno-[17,16-c]pyrazole*

A solution of 500 mg. of 16-ethoxalylestrone methyl ether (Example 1) and 0.08 ml. of 99–100% hydrazine hydrate in 25 ml. of absolute alcohol is refluxed for 1.5 hours. The solution shows a weakly positive test with 1% ethanolic ferric chloride solution. The solution is then allowed to stand at room temperature for 4 days during which period a crystalline material separates. Filtration gives 280 mg. (54%) of product, melting point 208–211° C. (gas), which shows a negative test with 1% ethanolic ferric chloride solution. Recrystallization from acetone-petroleum ether (boiling point 60–70°) gives white needles, melting point 209°–211° C. (gas); $[\alpha]_D^{25} + 178°$ (0.65% in chloroform);

$\lambda_{max.}^{CH_3OH}$ 221 m$\mu$ ($\epsilon$ 10,200), 288 m$\mu$ ($\epsilon$12,900); $\lambda_{max.}^{0.1\,N\,HCl}$ 223 m$\mu$ ($\epsilon$ 9550), 260 m$\mu$ ($\epsilon$ 3180); $\lambda_{max.}^{0.1\,N\,NaOH}$ 9m$\mu$ ($\epsilon$ 8360); $\lambda_{max.}^{KBr}$ 2.98, 5.93, 6.19, 6.34, 6.43, 6.66, 6.98

What is claimed is:
1. A compound of the formula:

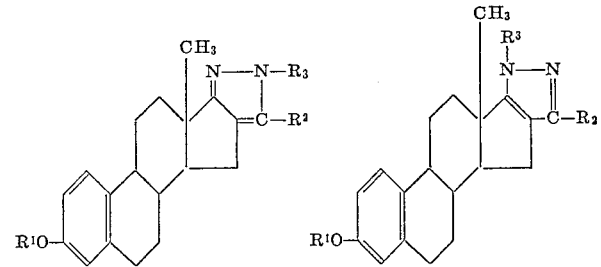

wherein $R^1$ is a lower alkyl radical, $R^2$ is a lower carboalkoxy radical, and $R^3$ is selected from the group consisting of hydrogen, phenyl, lower alkyl and lower alkanoyl radicals; and salts thereof.

2. The compound 5'-ethoxycarbonyl-3-methoxy-1,3,5-(10)-estratrieno-[17,16-c]pyrazole.

3. The compound 1'-phenyl-5'-isopropoxycarbonyl-3-methoxy-1,3,5(10)-estratrieno-[17,16-c]pyrazole.

4. The compound 2' - ethyl-5' - isobutoxycarbonyl-3-methoxy-1,3,5(10)-estratrieno-[17,16-c]pyrazole.

5. The compound 1'-acetyl-5'-ethoxycarbonyl-3-ethoxy-1,3,5(10)-estratrieno-[17,16-c]pyrazole.

6. The compound 2'-propionyl-5'-ethoxycarbonyl-3-ethoxy-1,3,5(10)-estratrieno-[17,16-c]pyrazole.

7. A compound selected from the group consisting of 16-lower alkoxalyl-3-lower alkoxy-17-hydroxy-1,3,5(10), 16-estratetraenes and tautomeric forms.

8. A compound selected from the group consisting of 16-ethoxalyl-3-methoxy-17-hydrovy - 1,3,5(10),16-estratetraene and tautomeric forms.

No references cited.

LEWIS GOTTS, *Primary Examiner.*

H. A. FRENCH, *Assistant Examiner.*